United States Patent
Russ et al.

(10) Patent No.: US 7,026,458 B2
(45) Date of Patent: Apr. 11, 2006

(54) HIGH LIGHT FASTNESS REACTIVE RED DYES

(75) Inventors: Werner Russ, Flörsheim-Wicker (DE); Warren James Ebenezer, Stockport (GB); Anthony Lawrence, Manchester (GB)

(73) Assignee: DyStar Textilfarben GbmH & Co. Deutschland KG, (DE)

( * ) Notice: Subject to any disclaimer, the term of this patent is extended or adjusted under 35 U.S.C. 154(b) by 5 days.

(21) Appl. No.: 10/937,126

(22) Filed: Sep. 9, 2004

(65) Prior Publication Data

US 2005/0059811 A1 Mar. 17, 2005

(30) Foreign Application Priority Data

Sep. 12, 2003 (GB) .................................. 0321437

(51) Int. Cl.
C09B 62/09 (2006.01)
D06P 1/382 (2006.01)

(52) U.S. Cl. .......................................... 534/634; 8/549
(58) Field of Classification Search ................ 534/634; 8/549

See application file for complete search history.

(56) References Cited

U.S. PATENT DOCUMENTS 6,319,290 B1  11/2001  Kalweit et al.
6,482,255 B1  11/2002  Lavery et al.

FOREIGN PATENT DOCUMENTS

GB           854432       11/1960
GB         2 331 757       2/1999
WO        WO-99/21922      5/1999

*Primary Examiner*—Fiona T. Powers
(74) *Attorney, Agent, or Firm*—Connolly Bove Lodge & Hutz

(57) ABSTRACT

The present invention refers to dyestuffs of the formula (I)

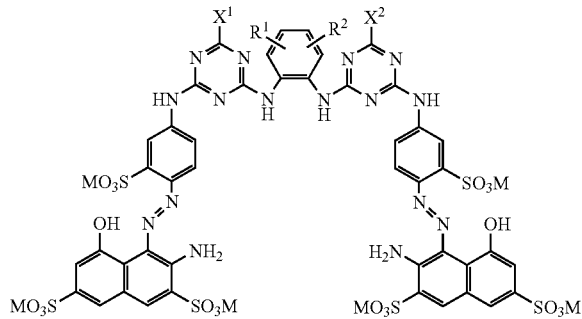

(I)

wherein
$R^1$ is H or $(C_1–C_4)$-alkyl;
$R^2$ is H or $(C_1–C_4)$-alkyl;
each of $X^1$ and $X^2$, independently, is a labile atom or group; and
M is H, an alkali metal, an ammonium ion or the equivalent of an alkaline earth metal,
wherein compounds wherein $R^1$ and $R^2$ are H are excluded, mixtures of the dyestuffs of the formula (I) with dyestuffs of the formula (II)

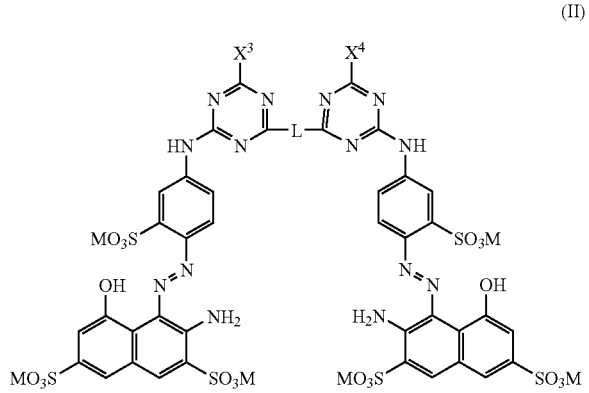

(II)

wherein
each of $X^3$ and $X^4$, independently, is a labile atom or group;
L is an organic linking group; and
M is H, an alkali metal, an ammonium ion or the equivalent of an alkaline earth metal,
processes for the preparation of said dyestuffs and said dyestuff mixtures and their use for dyeing and printing hydroxy- and/or carboxamido-containing fiber materials.

14 Claims, No Drawings

HIGH LIGHT FASTNESS REACTIVE RED DYES

The present invention relates to the field of fibre-reactive dyes.

Dyestuffs containing chromophores linked via a phenylene diamine linking unit are known from literature and are described for example in GB-A 2,331,757.

The inventors of the present invention have surprisingly found that dyestuffs which are obtained when ortho-phenylene diamine type linking units, which are substituted in the phenylene ring, are used to link two chromophores are particularly suitable for hot dyeing (70–95° C.) of cellulose or other nucleophilic fibres under exhaust conditions. Such dyestuffs show high light fastness, high perspiration light fastness, good build-up properties and good solubility in salt solution. For example, their build-up and solubility in salt solution are surprisingly higher compared to dyestuff 5 of table 1 from GB-A 2,331,757.

The present invention claims dyestuffs of the formula (I)

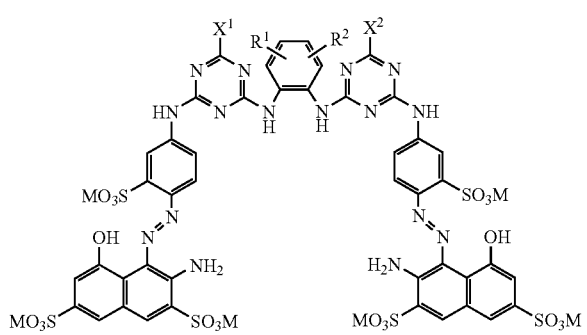

(I)

wherein
$R^1$ is H or $(C_1-C_4)$-alkyl;
$R^2$ is H or $(C_1-C_4)$-alkyl;
each of $X^1$ and $X^2$, independently, is a labile atom or group; and
M is H, an alkali metal, an ammonium ion or the equivalent of an alkaline earth metal,
wherein compounds wherein $R^1$ and $R^2$ are H are excluded.

$R^1$ and $R^2$ may be straight-chain or branched and is for example methyl, ethyl, n-propyl, i-propyl or n-butyl. Preferably, $R^1$ is H and $R^2$ is methyl or $R^1$ and $R^2$ are both methyl.

$X^1$ and $X^2$, independently, are preferably halogen, like fluorine, chlorine and bromine and are especially preferably chlorine.

M is preferably H, sodium or potassium.

In a preferred dye of the formula (I) $R^1$ is H, $R^2$ is methyl or $R^1$ and $R^2$ are methyl, $X^1$ and $X^2$ are both chlorine and M is H, sodium or potassium.

The present invention in addition claims dyestuff mixtures comprising (a) one or more dyestuffs of the formula (I) and
(b) one or more dyestuffs of the formula (II)

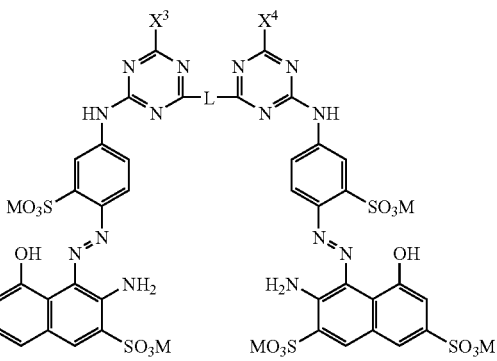

(II)

wherein
each of $X^3$ and $X^4$, independently, is a labile atom or group;
L is an organic linking group; and
M is defined as given above.

$X^3$ and $X^4$, independently, are preferably halogen, like fluorine, chlorine and bromine and are especially preferably chlorine.

L preferably derives from aminoethylpiperazine, piperazine, 2-methyl-piperazine, ethylenediamine, N-methylethylenediamine, N,N'-dimethylethylenediamine, propylenediamine, N-methylpropylenediamine, N,N'-dimethylpropylenediamine, 2-methylpropylenediamine, 2,2-dimethylpropylenediamine, 1,2-phenylenediamine, 1,3-phenylenediamine, 1,4-phenylenediamine or 2-aminoethanethiol.

In a preferred dye of the formula (II) $X^3$ and $X^4$ are both chlorine, L derives from aminoethylpiperazine or ethylenediamine and M is H, sodium or potassium.

The inventive dyestuff mixtures preferably contain from 50 to 95% by weight of one or more dyestuffs of the formula (I) and from 5 to 50% by weight of one or more of the dyestuffs of the formula (II), based on the weight of the dyestuffs (I) and (II).

The inventive dyestuff mixtures especially preferably contain from 70 to 95% by weight of one or more dyestuffs of the formula (I) and from 5 to 30% by weight of one or more of the dyestuffs of the formula (II), based on the weight of the dyestuffs (I) and (II).

The dyestuffs and dyestuff mixtures of the present invention can be present as a preparation in solid or liquid (dissolved) form. In solid form they generally contain the electrolyte salts customary in the case of water-soluble and in particular fibre-reactive dyes, such as sodium chloride, potassium chloride and sodium sulfate, and also the auxiliaries customary in commercial dyes, such as buffer substances capable of establishing a pH in aqueous solution between 3 and 7, such as sodium acetate, sodium borate, sodium bicarbonate, sodium citrate, sodium dihydrogenphosphate and disodium hydrogenphosphate, small amounts of siccatives or, if they are present in liquid, aqueous solution (including the presence of thickeners of the type customary in print pastes), substances which ensure the permanence of these preparations, for example mold preventatives.

In general, the dyestuffs and dyestuff mixtures of the present invention are present as dye powders containing 10 to 80% by weight, based on the dye powder or preparation, of a strength-standardizing colorless diluent electrolyte salt, such as those mentioned above. These dye powders may additionally include the aforementioned buffer substances in a total amount of up to 10%, based on the dye powder. If the dyestuffs and dyestuff mixtures of the present invention are present in aqueous solution, the total dye content of these aqueous solutions is up to about 50% by weight, for example between 5 and 50% by weight, and the electrolyte salt content of these aqueous solutions will preferably be below 10% by weight, based on the aqueous solutions. The aqueous solutions (liquid preparations) may include the aforementioned buffer substances in an amount which is generally up to 10% by weight, for example 0.1 to 10% by weight, preference being given to up to 4% by weight, especially 2 to 4% by weight.

A dyestuff of the formula I may for example be prepared by reacting an ortho-phenylenediamine of the formula (III)

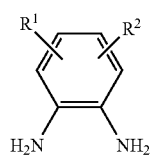

(III)

wherein $R^1$ and $R^2$ are defined as given above, with a compound of the formula (IV)

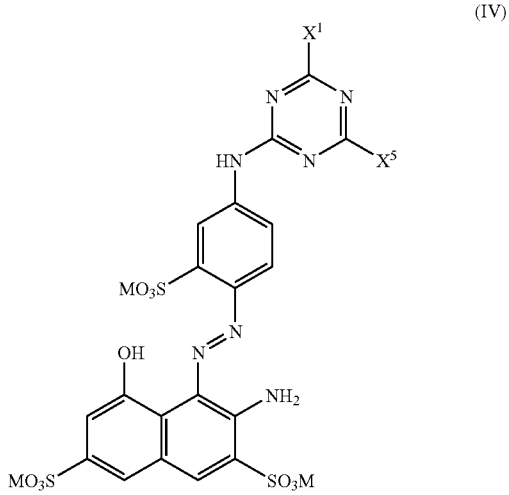

(IV)

wherein $X^1$ and M are defined as given above and $X^5$ is a labile atom or a group capable of reaction with an amine, preferably chlorine, and with a compound of the formula V

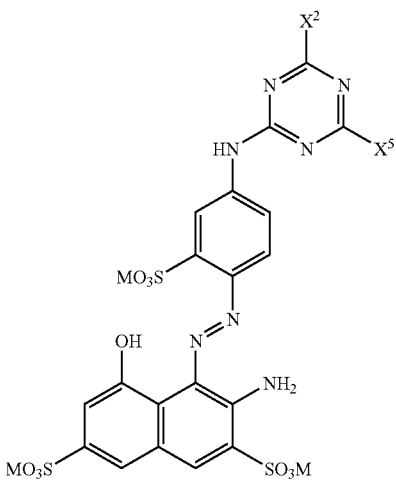

(V)

wherein $X^2$, $X^5$ and M are defined as given above.

In general, one mole of a compound of the formula III is reacted with one mole of a compound of the formula IV and one mole of a compound of the formula V in a manner known per se to a skilled person. $X^1$ and $X^2$ are usually identical and in this case, one mole of a compound of the formula III is reacted with two moles of a compound of the formula IV or V.

The compounds of the formulae III, IV and V are known or can easily be prepared by a skilled person using methods which are known per se.

The dyestuffs of the formula (II) are known and described in for example GB 2,331,757. They can be prepared as described in the cited literature or in analogy with the methods given above for the preparation of the dyestuffs of the formula (I).

The dye mixtures of the present invention can be obtained in a conventional manner, for instance by mechanically mixing the individual dyes of the formulae (I) and (II) in solid form or in form of aqueous solutions in the required proportions. Alternatively, they can be obtained by synthesis by means of the customary condensation reactions using appropriate mixtures of compounds of the formulae (III), (IV), (V) and of a compound of the formula H-L-H, wherein L is defined as given above, in a manner familiar to those skilled in the art and the necessary proportions.

Thus, reaction of for example 4 moles of a compound of the formula (IV) with one mole of a compound of the formula (III) and one mole of a compound of the formula H-L-H results in an inventive mixture of one mole of a dyestuff of the formula (I) and one mole of a dyestuff of the formula (II). It is preferred to perform such reactions as one-pot synthesis.

The dyestuffs and dyestuff mixtures of the instant invention are suitable for dyeing and printing hydroxy- and/or carboxamido-containing fibre materials by the application and fixing methods numerously described in the art for fibre-reactive dyes. They provide exceptionally bright, exceptionally strong and economic shades. Such dyes especially when used for exhaust dyeing of cellulosic materials can exhibit excellent properties including build-up, aqueous solubility, light-fastness, wash off and robustness to process variables. They are also wholly compatible with similar dyes designed for high temperature (80–100° C.) application to cellulosic textiles, and thus lead to highly reproducible application processes, with short application times.

The present invention therefore also provides for use of the inventive dyestuffs and dyestuff mixtures for dyeing and printing hydroxy- and/or carboxamido-containing fibre materials and processes for dyeing and printing such materials using a dyestuff and a dyestuff mixture, respectively, according to the invention. Usually the dyestuff or dyestuff mixture is applied to the substrate in dissolved form and fixed on the fibre by the action of an alkali or by heating or both.

Hydroxy-containing materials are natural or synthetic hydroxy-containing materials, for example cellulose fiber materials, including in the form of paper, or their regenerated products and polyvinyl alcohols. Cellulose fiber materials are preferably cotton but also other natural vegetable fibers, such as linen, hemp, jute and ramie fibres. Regenerated cellulose fibers are for example staple viscose and filament viscose.

Carboxamido-containing materials are for example synthetic and natural polyamides and polyurethanes, in particular in the form of fibers, for example wool and other animal hairs, silk, leather, nylon-6,6, nylon-6, nylon-11, and nylon-4.

Application of the inventive dyestuffs and dyestuff mixtures is by generally known processes for dyeing and printing fibre materials by the known application techniques for fibre-reactive dyes. The dyestuffs and dyestuff mixtures according to the present invention are highly compatible with similar dyes designed for high temperature (80–100° C.) applications and are advantageously useful in exhaust dyeing processes.

Similarly, the conventional printing processes for cellulose fibres, which can either be carried out in single-phase, for example by printing with a print paste containing sodium bicarbonate or some other acid-binding agent and the colorant, and subsequent steaming at appropriate temperatures, or in two phases, for example by printing with a neutral or weakly acid print paste containing the colorant and subsequent fixation either by passing the printed material through a hot electrolyte-containing alkaline bath or by overpadding with an alkaline electrolyte-containing padding liquor and subsequent batching of this treated material or subsequent steaming or subsequent treatment with dry heat, produce strong prints with well defined contours and a clear white ground. Changing fixing conditions has only little effect on the outcome of the prints. Not only in dyeing but also in printing the degrees of fixation obtained with dyestuffs or dyestuff mixtures of the invention are very high. The hot air used in dry heat fixing by the customary thermofix processes has a temperature of from 120 to 200° C. In addition to the customary steam at from 101 to 103° C., it is also possible to use superheated steam and high pressure steam at up to 160° C.

The inventive dyestuffs and dyestuff mixtures can in addition be used to produce inks useful for printing the substrates described above, for example textiles, especially cellulosic textiles, and paper. Such inks can be used in all technologies, for example conventional printing, ink-jet printing or bubble-jet printing (for information on such printing technologies see for example Text. Chem. Color, Volume 19(8), pages 23 ff and Volume 21, pages 27 ff).

Acid-binding agents responsible for fixing the dyes to cellulose fibers are for example water-soluble basic salts of alkali metals and of alkaline earth metals of inorganic or organic acids, and compounds which release alkali when hot. Of particular suitability are the alkali metal hydroxides and alkali metal salts of weak to medium inorganic or organic acids, the preferred alkali metal compounds being the sodium and potassium compounds. These acid-binding agents are for example sodium hydroxide, potassium hydroxide, sodium carbonate, sodium bicarbonate, potassium carbonate, sodium formate, sodium dihydrogen-phosphate and disodium hydrogenphosphate.

Treating the dyestuffs and dyestuff mixtures according to the invention with the acid-binding agents with or without heating bonds the dyestuffs chemically to the cellulose fibers. Especially the dyeings on cellulose, after they have been given the usual aftertreatment of rinsing to remove unfixed dye portions, show excellent properties.

The dyeings of polyurethane and polyamide fibres are customarily carried out from an acid medium. The dyebath may contain for example acetic acid and/or ammonium sulfate and/or acetic acid and ammonium acetate or sodium acetate to bring it to the desired pH. To obtain a dyeing of acceptable levelness it is advisable to add customary leveling auxiliaries, for example based on a reaction product of cyanuric chloride with three times the molar amount of an aminobenzenesulfonic acid or aminonaphthalenesulfonic acid or based on a reaction product of for example stearylamine with ethylene oxide. In general the material to be dyed is introduced into the bath at a temperature of about 40° C. and agitated therein for some time, the dyebath is then adjusted to the desired weakly acid, preferably weakly acetic acid, pH, and the actual dyeing is carried out at temperature between 60 and 98° C. However, the dyeings can also be carried out at the boil or at temperatures up to 120° C. (under superatmospheric pressure).

EXAMPLE 1 a) Synthesis of the dichloro-triazinyl-dyebase Common Intermediate (IVa)

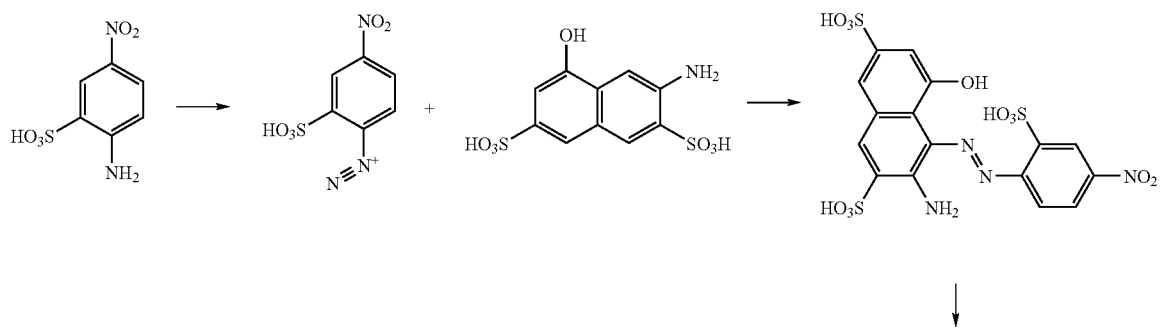

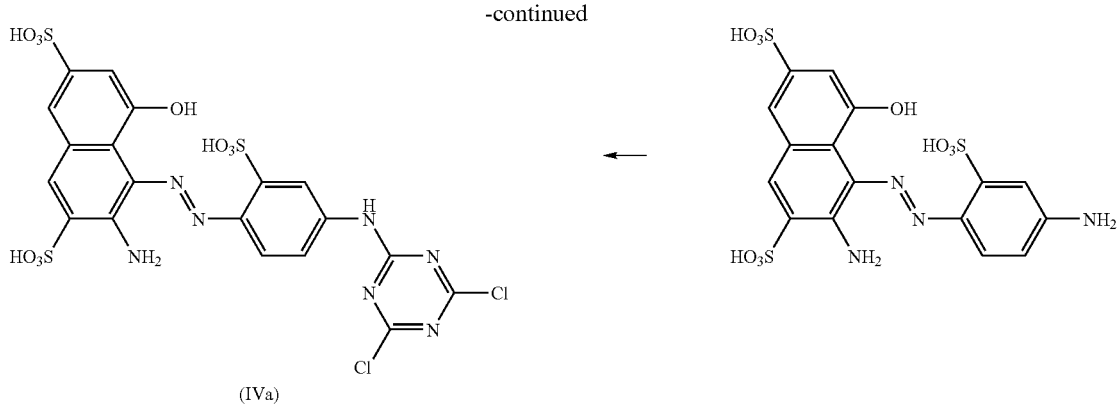

2-Amino-5-nitrobenzenesulfonic acid (26.6 g, 82%-str, 0.100 Mol) was suspended in water (500 ml) at pH<1.0. Ice (350 g) was added, followed by sodium nitrite (6.9 g, 0.100 Mol) in water (40 ml) over 2 minutes, keeping pH<1.2. Reaction was stirred for 15 mins, excess nitrite quenched by adding sulfamic acid (0.19), then 2-amino-8-naphthol-3,6-disulfonic acid (44.6 g, 0.090 mol) was added and the pH adjusted and held at pH 3.0 for 2 hrs. The reaction mixture was adjusted to pH 9.0 and heated to 40° C. Na$_2$S (26.0 g, 60% str, 0.200 mol) was added, the reaction stirred for 15 minutes before pH was adjusted to 1.0 and NaCl (10% w/v, 110 g) added. The resultant suspension was stirred for 30 mins and the solid collected by filtration. The solid was washed with NaCl solution (20%-w/v, 500 ml) then dissolved in water (600 ml) by stirring for 1 hr at pH 7.0. The reaction mixture was stirred vigorously, solid cyanuric chloride (11.99 g, 0.065 Mol) added and pH was regulated at 3.7–4.0 for 60 minutes then adjusted to and held at pH 7.5 for 60 minutes. HPLC analysis revealed the solubilised material (IVa) to be a single component.

b) Synthesis of Dyestuff (Ia)

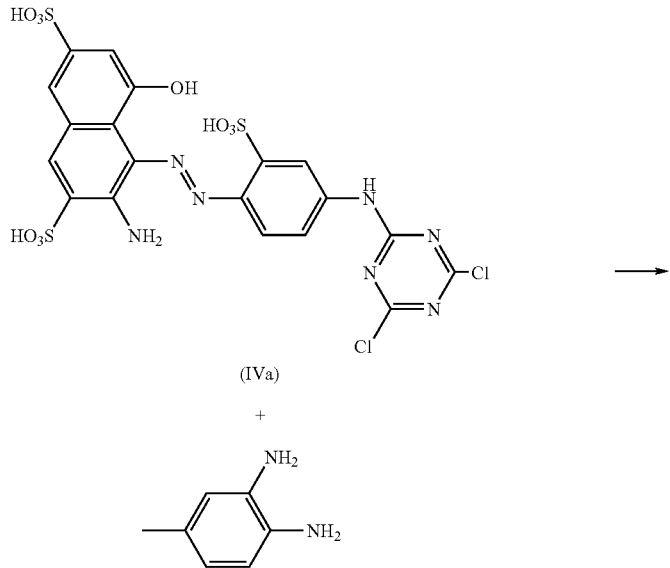

-continued

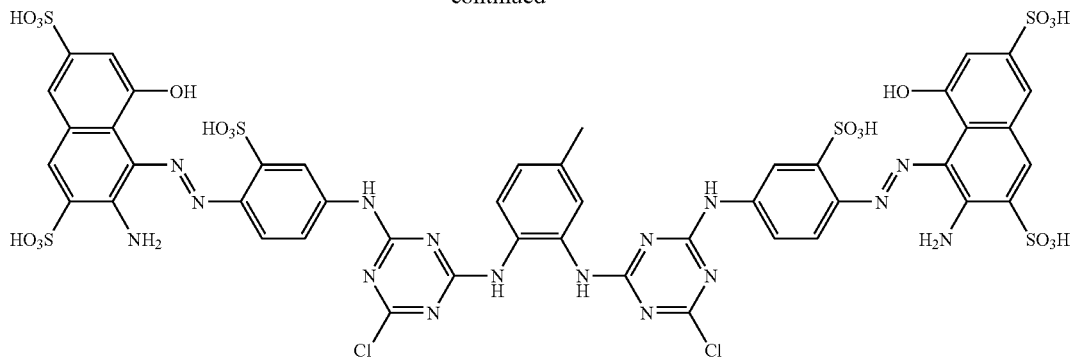

(Ia)

To a solution of intermediate (IVa) (0.062 Mol) was added 4-methyl-1,2-phenylenediamine (3.60 g, 0.03 Mol), the mixture stirred for 16 hrs at pH 7.0 then heated to 50° C. for 2 hrs at pH 7.0. The reaction was judged complete by HPLC. The solution was dried to a purple solid (75.3 g, 63% Yield). Analytical data were consistent with the required product (Ia); UV: $\lambda_{max}$=525, 5 nm, $\epsilon_{max}$=51000.

c) Comparisons of Dyestuff (Ia) with Dyestuff 5 of Table 1 from GB-A 2,331,757 (Hereinafter Called Dyestuff 5)

9% w/v solutions of Dyestuff (Ia) and of Dyestuff (5) were prepared at 50° C. and salt added to produce a 90 g/L salt solution. After 30 mins, 4.2% of Dyestuff (Ia) remained in solution whilst only 2.8% of Dyestuff (5) remained in solution. Thus Dyestuff (Ia) is 50% more soluble in 90 g/L salt at 50° C. than Dyestuff (5). This factor can be crucial as dyeings are carried out at high salt concentrations and better salt solubility can avoid problems with unlevel exhaustion onto the fibre from an exhaust dyebath.

A comparison of the depth of build-up on cotton revealed that the improvement provided by Dyestuff (Ia) over Dyestuff (5) is 25%. Thus surprisingly Dyestuff (Ia) colours cotton much more efficiently than Dyestuff (5).

EXAMPLE 2

One-Pot Synthesis of an 80:20 Mixture of Dyestuff (Ia) and Dyestuff (IIa)

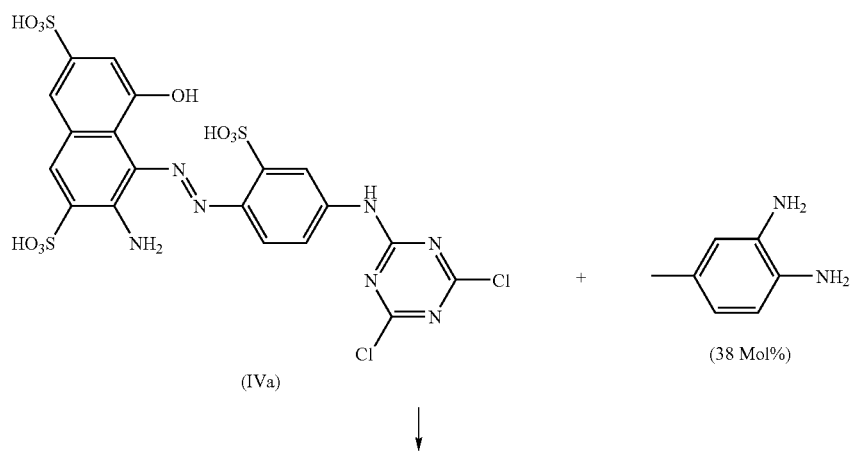

-continued
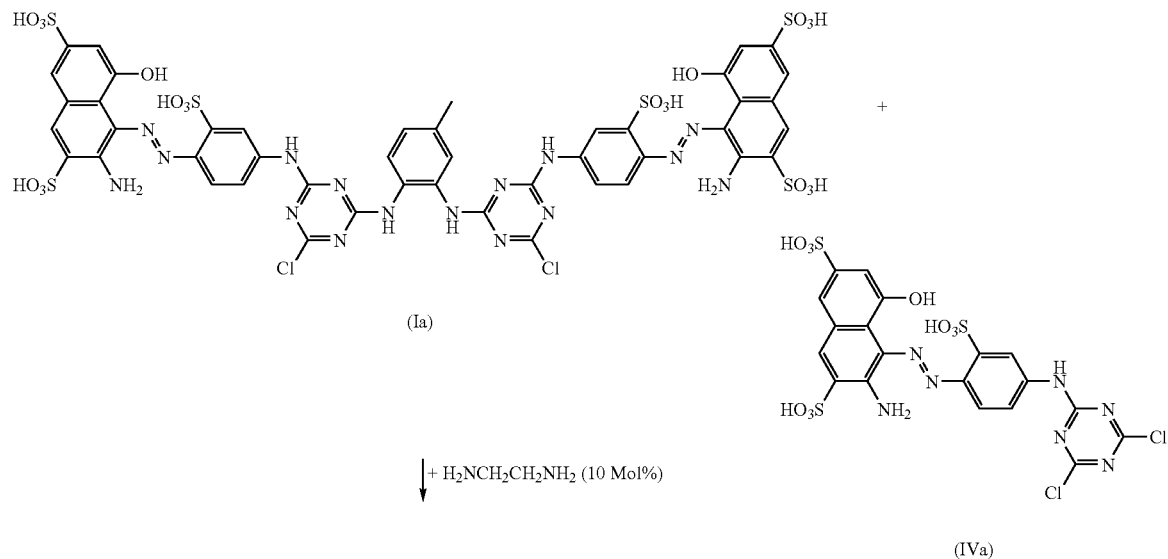
(Ia)
(IVa)
+ H₂NCH₂CH₂NH₂ (10 Mol%)
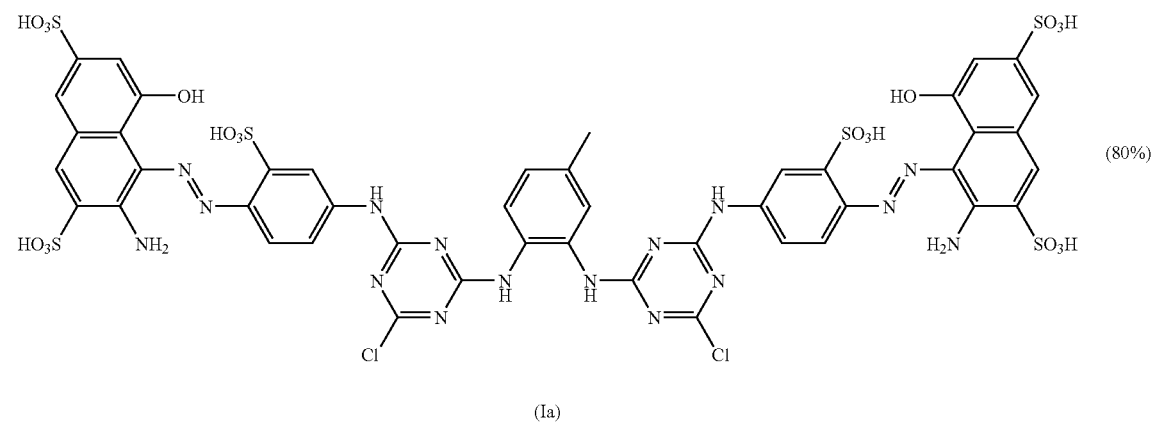
(Ia) (80%)
+
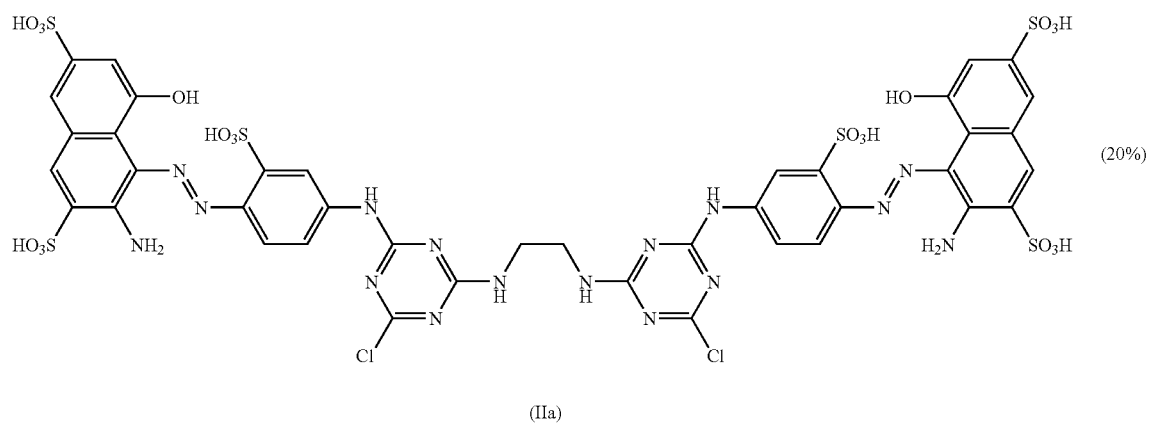
(IIa) (20%)

To solution of intermediate (IVa) (0.010 Mol) was added 4-methyl-1,2-phenylenediamine (0.46 g, 0.0038 Mol), the mixture stirred for 16 hrs at pH 7.0 then ethylenediamine (0.06 g, 0.001 Mol) added, reaction stirred at pH 10.0 for 1 hr then heated to 45° C. for 1 hr. The reaction was judged complete by HPLC. The solution was dialysed to remove excess salt then evaporated to dryness to yield a purple solid (10.0 g, 100% Yield). UV: $\lambda_{max}$=525.5 nm, $\epsilon_{max}$=51000.

EXAMPLE 3

One-Pot synthesis of an 80:20 Mixture of Dyestuff (Ia) and Dyestuff (IIb)

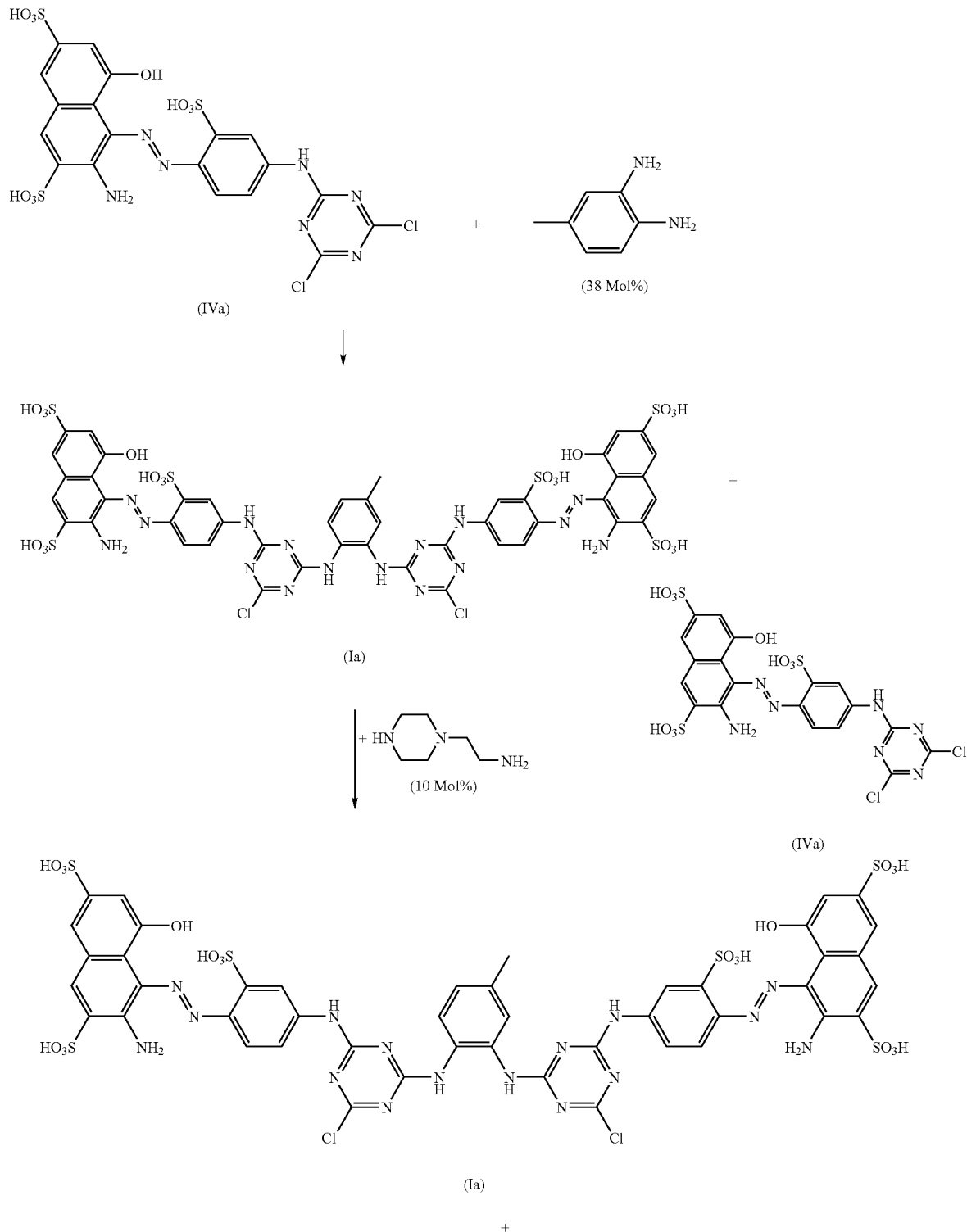

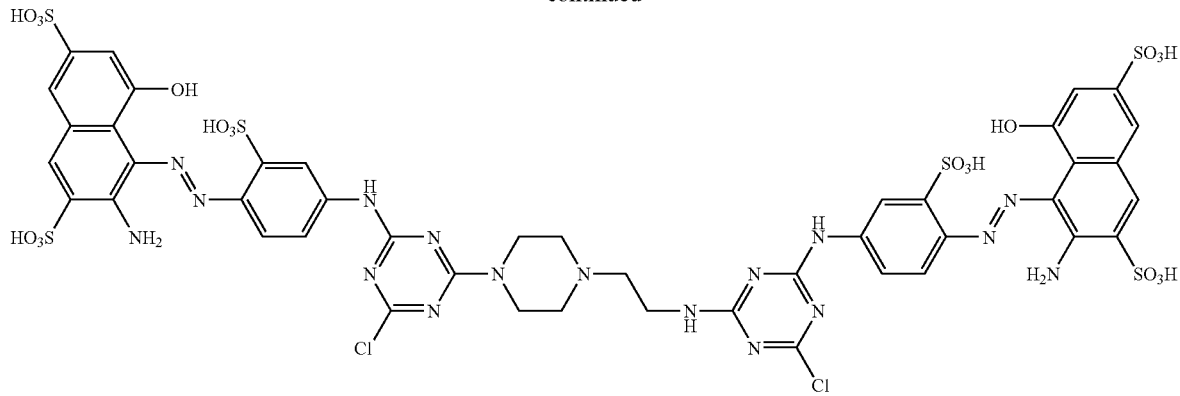

(IIb)

To solution of intermediate (IVa) (0.010 Mol) was added 4-methyl-1,2-phenylenediamine (0.46 g, 0.0038 Mol), the mixture stirred for 16 hrs at pH 7.0 then aminoethylpiperazine (0.06 g, 0.001 Mol) added, reaction stirred at pH 10.0 for 1 hr then heated to 45° C. for 1 hr. The reaction was judged complete by HPLC. The solution was dialysed toremove excess salt then evaporated to dryness to yield a purple solid (7.9 g, 82% Yield). UV: $\lambda_{max}$=525.5 nm, $\epsilon_{max}$=51000.

EXAMPLE 4

Synthesis of Dyestuff (Ib)

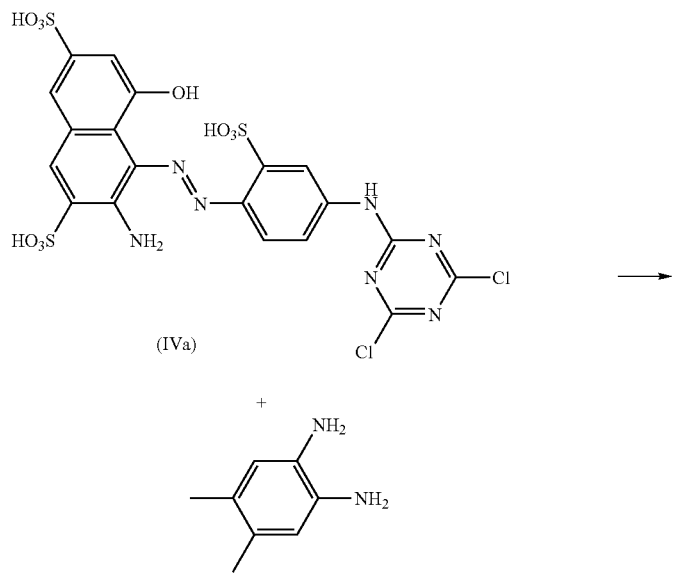

-continued

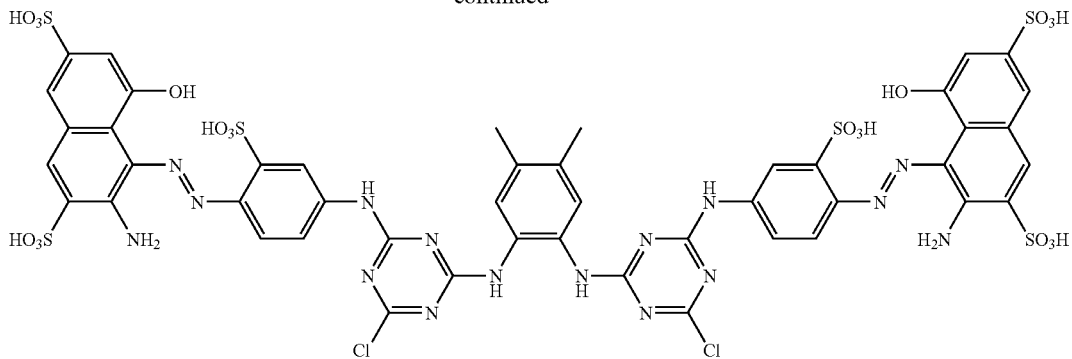

(Ib)

To a solution of intermediate (IVa) (0.007 Mol) was added 4,5-dimethyl-1,2-phenylenediamine (0.39 g, 0.0032 Mol), the mixture stirred for 16 hrs at pH 7.0 then heated to 50° C. for 2 hrs at pH 7.0. The reaction was judged complete by HPLC. Ethanol was added to precipitate a purple solid (4.8 g, 81% Yield). Analytical data were consistent with the required product (Ib); UV: $\lambda_{max}$=525,5 nm, $\epsilon_{max}$=51000.

EXAMPLE 5

Synthesis of Dyestuff (Ic)

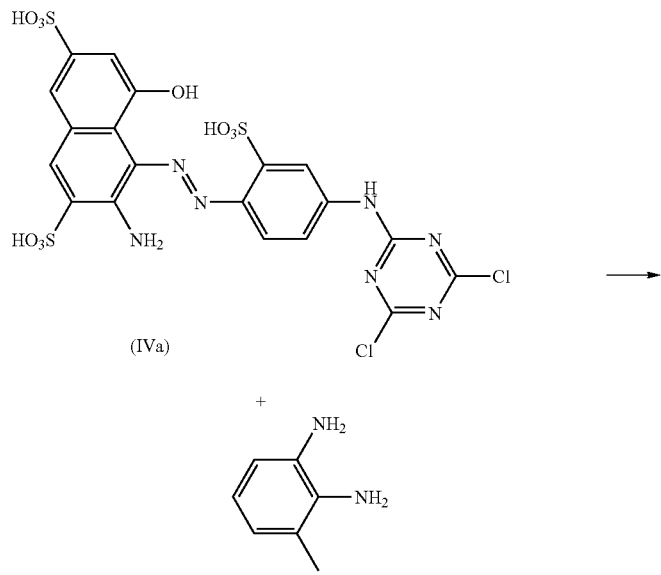

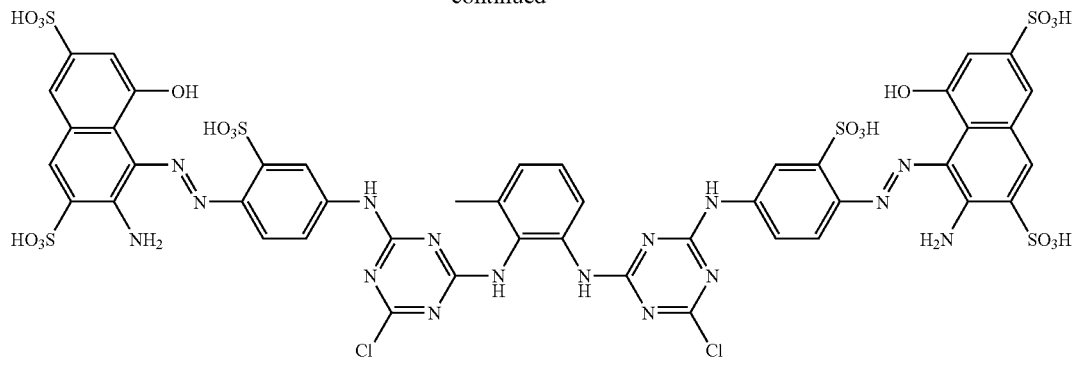

(Ic)

To a solution of intermediate (IVa) (0.007 Mol) was added 2,3-diaminotoluene (0.35 g, 0.0032 Mol), the mixture stirred for 6 hrs at pH 7.0 and 50° C. Further portions of intermediate (IVa) (0.0007 Mol) were added and reaction continued under the same conditions until no further mono-condensate (arising from mono-condensation of intermediate (IVa) with 2,3-diaminotoluene) was observed by HPLC. HPLC showed the final product contain 10% of product arising from hydrolysis. Ethanol was added to precipitate a purple solid (4.5 g, 76% Yield). Analytical data were consistent with the required product; UV: $\lambda_{max}$=525, 5 nm, $\epsilon_{max}$=51000.

The invention claimed is:

1. Dyestuff of the formula I

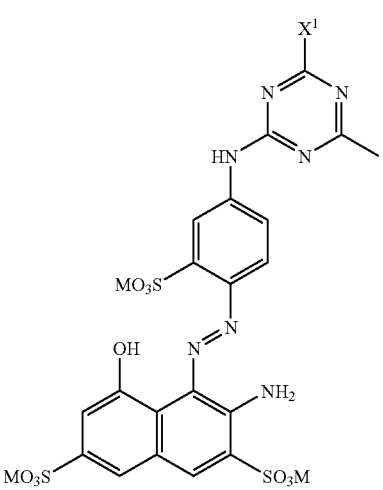

(I)

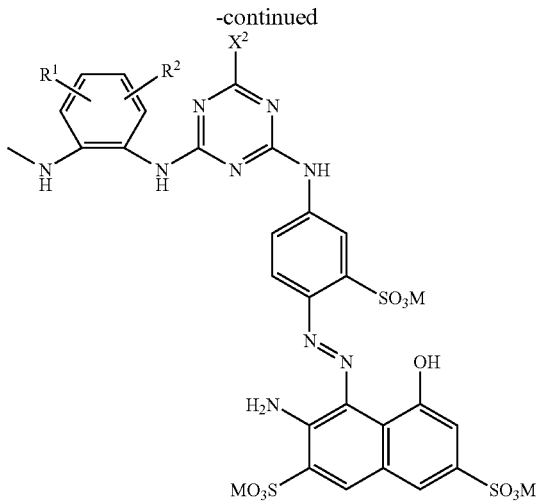

wherein $R^1$ is H or $(C_1-C_4)$-alkyl;

$R^2$ is H or $(C_1-C_4)$-alkyl;

each of $X^1$ and $X^2$, independently, is a labile atom or group; and

M is H, an alkali metal, an ammonium ion or the equivalent of an alkaline earth metal, wherein compounds wherein $R^1$ and $R^2$ are H are excluded.

2. Dyestuff according to claim 1, wherein $R^1$ is H, $R_2$ is methyl or $R^1$ and $R^2$ are methyl, $X^1$ and $X^2$ are both chlorine and M is H, sodium or potassium.

3. Dyestuff mixture comprising a) one or more dyestuffs of the formula (I) and b) one or more dyestuffs of the formula (II)

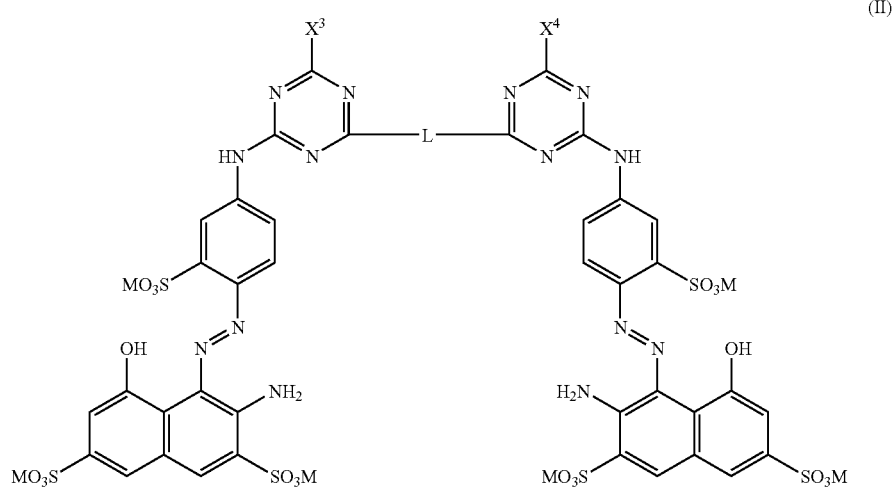

wherein
- each of $X^3$ and $X^4$, independently, is a labile atom or group;
- L is an organic linking group; and
- M is H, an alkali metal, an ammonium ion or the equivalent of an alkaline earth metal.

4. Dyestuff mixture according to claim 3, wherein in the dyestuff of the formula (II) L derives from aminoethylpiperazine, piperazine, 2-methyl-piperazine, ethylenediamine, N-methylethylenediamine, N,N'-dimethylethylenediamine, propylenediamine, N-methylpropylenediamine, N,N'-dimethylpropylenediamine, 2-methylpropylene-diamine, 2,2-dimethylpropylenediamine, 1,2-phenylenediamine, 1,3-phenylene-diamine, 1,4-phenylenediamine or 2-aminoethanethiol.

5. Dyestuff mixture according to claim 3, wherein in the dyestuff of the formula (II) $X^3$ and $X^4$ are both chlorine, L derives from aminoethylpiperazine or ethylenediamine and M is H, sodium or potassium.

6. Dyestuff mixture according to claim 3, wherein it contains from 50 to 95% by weight of one or more dyestuffs of the formula (I) and from 5 to 50% by weight of one or more of the dyestuffs of the formula (II), based on the weight of the dyestuffs (I) and (II).

7. Dyestuff mixture according to claim 5, wherein it contains from 70 to 95% by weight of one or more dyestuffs of the formula (I) and from 5 to 30% by weight of one or more of the dyestuffs of the formula (II), based on the weight of the dyestuffs (I) and (II).

8. A process for preparing a dyestuff of formula I as claimed in claim 1, which comprises reacting an ortho-phenylenediamine of the formula (III)

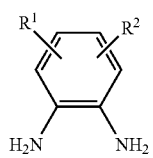

wherein $R^1$ and $R^2$ are defined as given above, with a compound of the formula (IV)

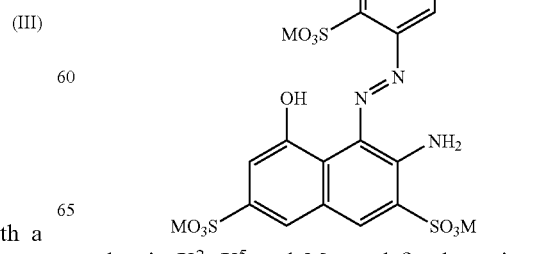

wherein $X^1$ and M are defined as given in claim 1 and $X^5$ is a labile atom or a group capable of reaction with an amine, and with a compound of the formula (V)

wherein $X^2$, $X^5$ and M are defined as given in claim 1.

9. A process for preparing a dyestuff mixture as claimed in claim 3, which comprises either
  a) mechanically mixing the individual dyes of the formulae (I) and (II) in solid form or in form of aqueous solutions in the required proportions or
  b) synthesizing by means of condensation reactions using mixtures of compounds of the formulae (III), (IV), (V) and of a compound of the formula H-L-H, wherein L is defined as given in claim 3.

10. A process for dyeing and printing hydroxy- and/or carboxamido-containing fibre material which comprises contacting the material with the dyestuff of the formula (I) according to claim 1.

11. A process for dyeing and printing hydroxy- and/or carboxamido-containing fibre material which comprises contacting the material with the dyestuff of the formula (I) according to claim 2.

12. A process for dyeing and printing hydroxy- and/or carboxamido-containing fibre material which comprises contacting the material with the dyestuff mixture according to claim 3.

13. A process for dyeing and printing hydroxy- and/or carboxamido-containing fibre material which comprises contacting the material with the dyestuff mixture according to claim 7.

14. A process for preparing a dyestuff mixture as claimed in claim 7, which comprises either
  a) mechanically mixing the individual dyes of the formulae (I) and (II) in solid form or in form of aqueous solutions in the required proportions or
  b) synthesizing by means of condensation reactions using mixtures of compounds of the formulae (III), (IV), (V) and of a compound of the formula H-L-H, wherein L is defined as given in claim 7.

* * * * *